United States Patent
Boudreau

(10) Patent No.: US 9,761,892 B2
(45) Date of Patent: Sep. 12, 2017

(54) ISOLATING WATER TRANSPORT PLATES FROM ELASTOMER SEALS

(71) Applicant: AUDI AG, Ingolstadt (GE)

(72) Inventor: David R. Boudreau, Westfield, MA (US)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 14/646,700

(22) PCT Filed: Nov. 30, 2012

(86) PCT No.: PCT/US2012/067333
§ 371 (c)(1),
(2) Date: May 21, 2015

(87) PCT Pub. No.: WO2014/084850
PCT Pub. Date: Jun. 5, 2014

(65) Prior Publication Data
US 2015/0288003 A1 Oct. 8, 2015

(51) Int. Cl.
*H01M 8/16* (2006.01)
*H01M 8/0276* (2016.01)
*H01M 8/241* (2016.01)
*H01M 8/028* (2016.01)
(Continued)

(52) U.S. Cl.
CPC ......... *H01M 8/0276* (2013.01); *H01M 8/028* (2013.01); *H01M 8/04291* (2013.01);
(Continued)

(58) Field of Classification Search
CPC ................................................. H01M 8/0271
See application file for complete search history.

(56) References Cited

U.S. PATENT DOCUMENTS 6,165,634 A 12/2000 Krasij et al.
6,660,422 B2 12/2003 Krasij et al.
(Continued)

FOREIGN PATENT DOCUMENTS

WO 02/093672 A2 11/2002

OTHER PUBLICATIONS

PCT International Search Report mailed on Sep. 25, 2013 for PCT Application No. PCT/US2012/067333 (4 pages).

*Primary Examiner* — Olatunji Godo
(74) *Attorney, Agent, or Firm* — Seed IP Law Group LLP

(57) ABSTRACT

A fuel cell stack (11) includes a plurality of contiguous fuel cells (13), each including a unitized electrode assembly (15) sandwiched between porous, anode (22) and cathode water transport plates (18). In areas where silicone rubber (29) or other elastomer covers edges of the fuel cells in order to form seals with an external manifold (27), adjacent edges of the water transport plates are supplanted by, or augmented with, an elastomer-impervious material (34). This prevents infusion of elastomer to the WTPs which can cause sufficient hydrophobicity as to reduce or eliminate water bubble pressure required to isolate the reactant gases from the coolant water, thereby preventing gaseous inhibition of the coolant pump. A preformed insert (34) may be cast into the water transport plates as molded, or a fusible or curable non-elastomer, elastomer-impervious in fluent form may be deposited into the pores of already formed water transport plates, and then fused or cured.

17 Claims, 5 Drawing Sheets

(51) Int. Cl.
*H01M 8/04291* (2016.01)
*H01M 8/0284* (2016.01)
*H01M 8/04119* (2016.01)
*H01M 8/1018* (2016.01)
*H01M 8/023* (2016.01)
*H01M 8/0245* (2016.01)
*H01M 8/0247* (2016.01)
*H01M 8/0282* (2016.01)
*H01M 8/0267* (2016.01)
*H01M 8/0286* (2016.01)

(52) U.S. Cl.
CPC .......... *H01M 8/2415* (2013.01); *H01M 8/023* (2013.01); *H01M 8/0245* (2013.01); *H01M 8/0247* (2013.01); *H01M 8/0267* (2013.01); *H01M 8/0282* (2013.01); *H01M 8/0284* (2013.01); *H01M 8/0286* (2013.01); *H01M 8/04171* (2013.01); *H01M 2008/1095* (2013.01)

(56) References Cited

U.S. PATENT DOCUMENTS

| | | |
|---|---|---|
| 7,112,384 B2 | 9/2006 | Dave et al. |
| 7,201,988 B2 | 4/2007 | Dave |
| 7,435,502 B2 | 10/2008 | Breault et al. |
| 2001/0001052 A1 | 5/2001 | Bonk et al. |
| 2001/0055708 A1* | 12/2001 | Krasij ................. H01M 8/0271 429/422 |
| 2005/0084735 A1* | 4/2005 | Breault ............. H01M 8/04253 429/461 |

* cited by examiner

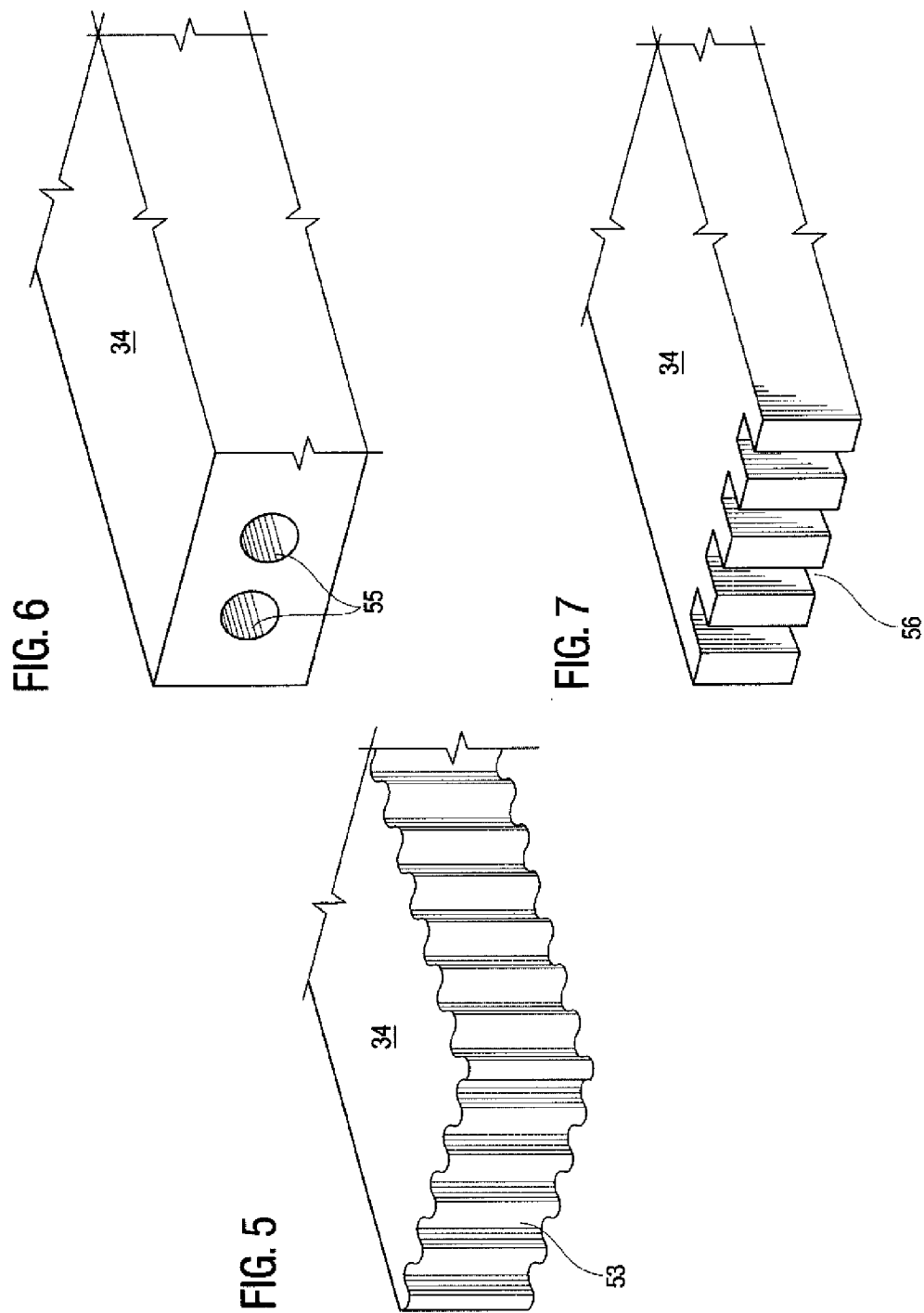

ISOLATING WATER TRANSPORT PLATES FROM ELASTOMER SEALS

The Government may have rights to this invention and any patent issued thereon by virtue of Contract No. FTA MA-04-7002 with the FTA National Fuel Cell Bus Program Nutmeg Program.

TECHNICAL FIELD

Porous, hydrophilic fuel cell substrates having water channels on one surface and reactant gas channels on an opposite surface, typically called water transport plates (WTPs), have an elastomer impervious material in the corners of WTPs where contact with elastomer seal material would otherwise render the WTPs hydrophobic over time, thus eliminating the water and bubble pressure that prevent gas crossover to coolant.

BACKGROUND ART

Referring to FIG. 1, a known stack 11 of fuel cells 13 applying gaseous reactants to a proton exchange membrane electrolyte, in a unitized electrode assembly 15, may be of the type employing porous, hydrophilic separator plates, which typically have gaseous reactant grooves on one surface of each substrate and grooves 16 for coolant, typically water, on the opposite surface. The cathode water transport plate 18 of one fuel cell flows oxidant in its reactant gas grooves 19 and the anode water transport plate 22 of the adjacent fuel cell, with which it is in contact, flows fuel in its reactant gas grooves 23. The fuel and oxidant are isolated from each other by water in the pores of the water transport plates, the capillary forces of which require a certain pressure for bubbles to pass through the water, which is called bubble pressure.

As the fuel cell stack is assembled, dimensional tolerances and positioning tolerances of the water transport plates, relative to each other and to the unitized electrode assembly, results in substrate edge misalignment which has been labeled a "skyline", as is illustrated by the differing heights of WTPs 18, 22 and the unitized electrode assemblies 15. Because of that, in order to provide a relatively smooth area for sealing the fuel cell edges to a surface of an external reactant gas manifold, such as the oxidant manifold 27, an elastomer filler, such as silicone rubber 29 is applied to the uneven edge surfaces of the fuel cells. This provides a sufficiently smooth bed for a rubber gasket 30 between the edge of the manifold 27 and the silicone 29, as described in U.S. Pat. Nos. 6,660,422 and 7,122,384, both incorporated herein by reference. In some instances, a thin rigid strip, which may be dielectric, is provided between the rubber gasket and the silicone 29.

It has been found that, in the area where the manifold 27 is sealed to fuel cells 13, leakage of reactant gas from the channels 19, 23 into the coolant in the channels 16 occurs to such an extent that the coolant pump cannot function. This happens in all fuel cell stacks, limiting the life of the stacks. It has also been found that replacing the external portions of the seal, such as a fresh layer of silicone and/or a new rubber gasket 30 are not effective in most cases. Typically, the stack has to be reassembled. After disassembly, the effected cell is useless and the material is, at best, recycled.

SUMMARY

Referring to FIG. 2, it has now been discovered that the leakage between the reactant gas channels and the water channels is occasioned by loss of bubble pressure in the WTPs.

It has further been learned that this in turn is caused by the infusion of elastomer, such as silicone, from the seal at the edge of the fuel cell components into the porous structure of the water transport plates 18, 22, as illustrated by the arrows 32.

The elastomer is very hydrophobic and coats the existing surfaces of the pores, without filling the pores, so that the area invaded by silicone becomes hydrophobic. When the extent of infusion is sufficient, reactant gas (typically, at a higher pressure) will pass into the water channels 16 (typically, at a lower pressure). The coolant system will eventually become sufficiently entrained with gas that the coolant pump can no longer effectively impel the coolant liquid, causing the system to shut down.

The modality herein provides at each edge of a WTP that is near the elastomer seal member, an elastomer-impervious material which will block the infusion of elastomer into the WTP. This modality prevents the elastomer from rendering edges of the WTP's hydrophobic, eliminates the loss of bubble pressure, and avoids the infusion of gas into the coolant system. The material extends beyond the elastomer and a small distance within the WTP, about 1 cm (⅓ inch), for the full thickness of the WTP.

The material may be precast and molded into the WTP as the WTP is formed. The material may alternatively be deposited in fluent form in the pores of an unmasked portion of the WTP, then solidified, by fusing or curing below the WTP molding temperature.

Other variations will become more apparent in the light of the following detailed description of exemplary embodiments, as illustrated in the accompanying drawings.

BRIEF DESCRIPTION OF THE DRAWINGS

FIGS. 5-7 are fragmentary perspective views of alternative embodiments of silicone-impervious inserts of the present modality.

MODE(S) OF IMPLEMENTATION

Figure 1:
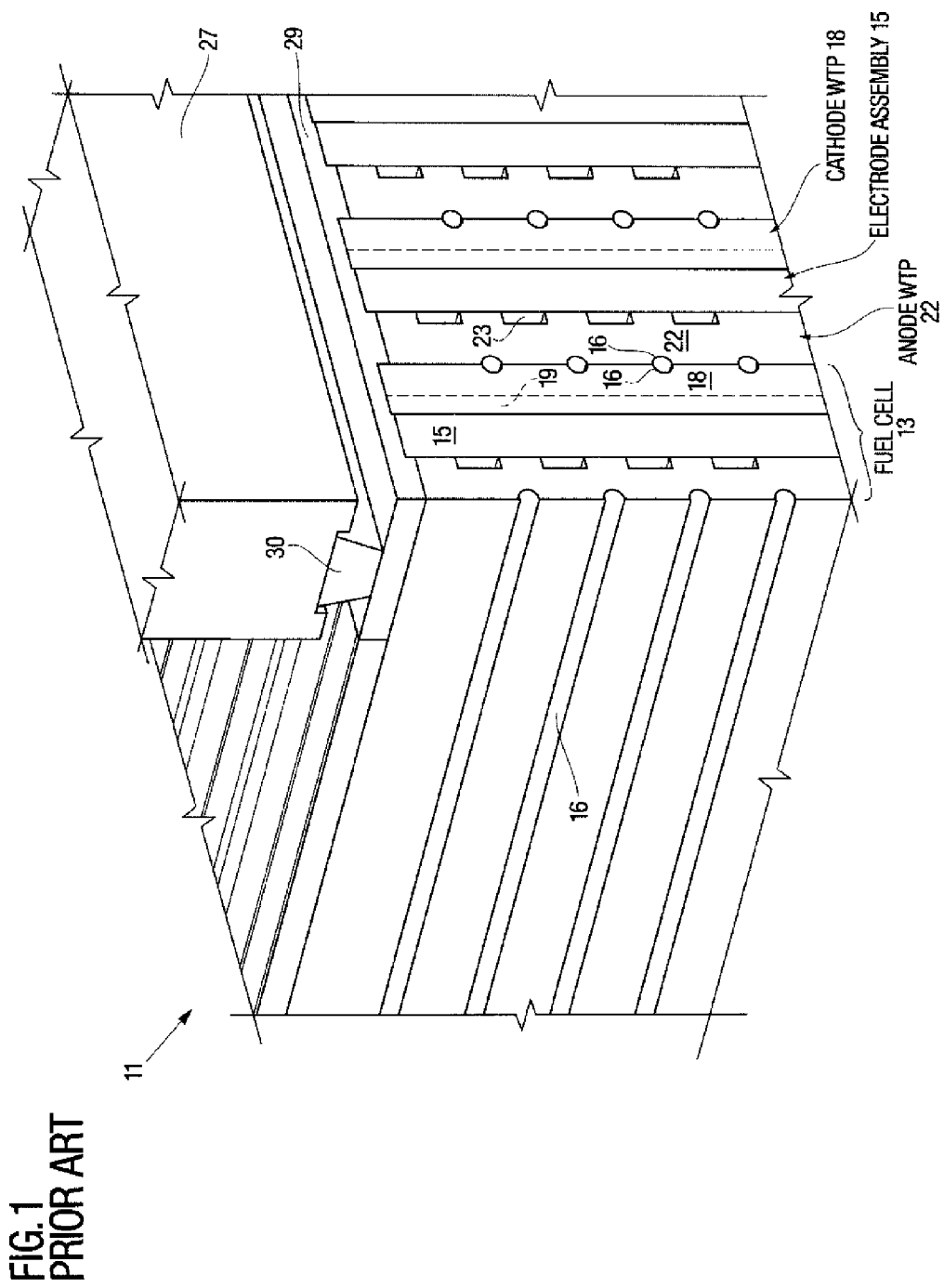
FIG. 1 is a fragmentary perspective view of fuel cell components, drawn with exaggerated proportions, beneath the edge of an external manifold with a rubber gasket and silicone seal.
Figure 2:
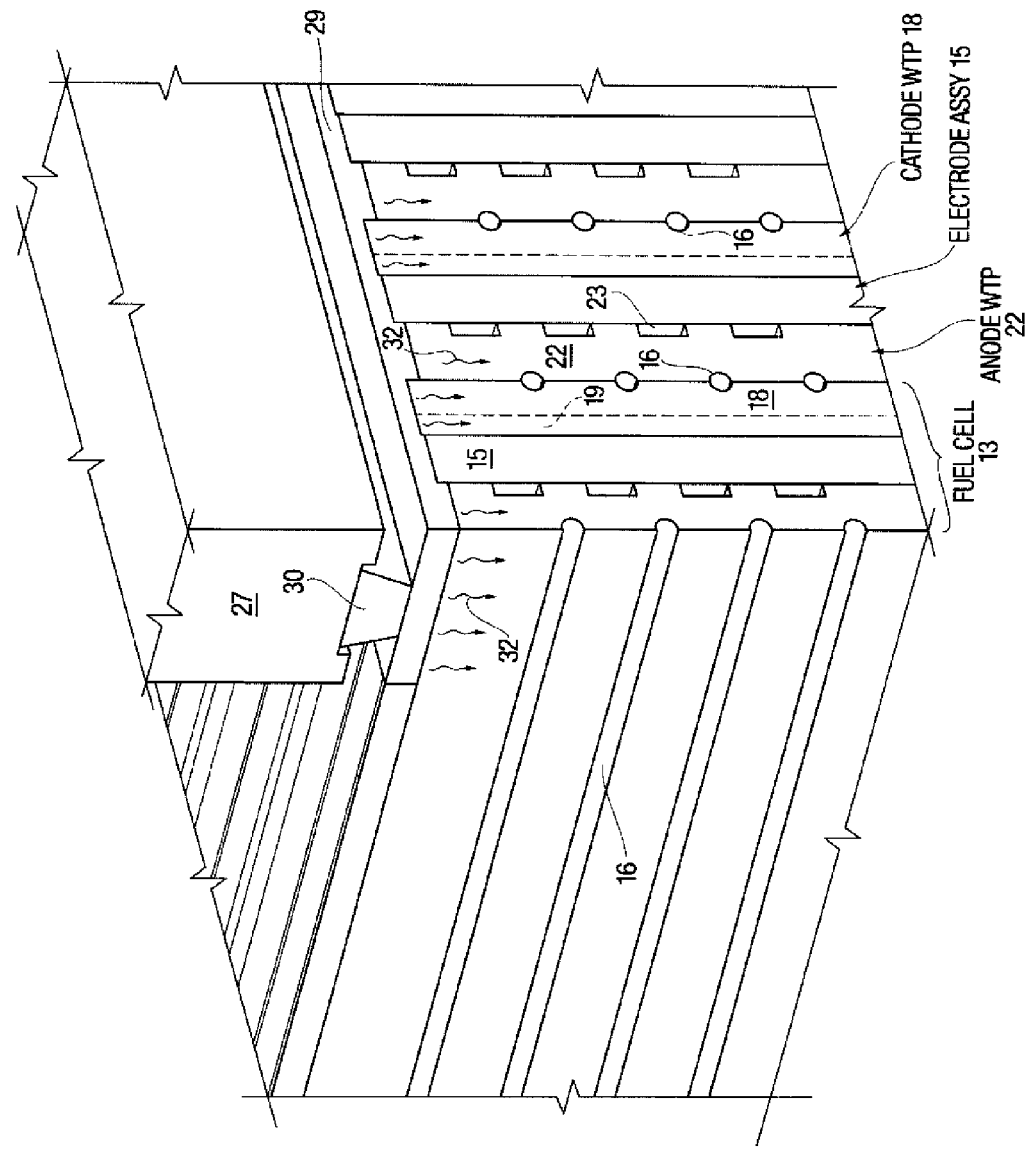
FIG. 2 is a fragmentary perspective view of FIG. 1 illustrating infusion of silicone into WTPs.
Figure 3:
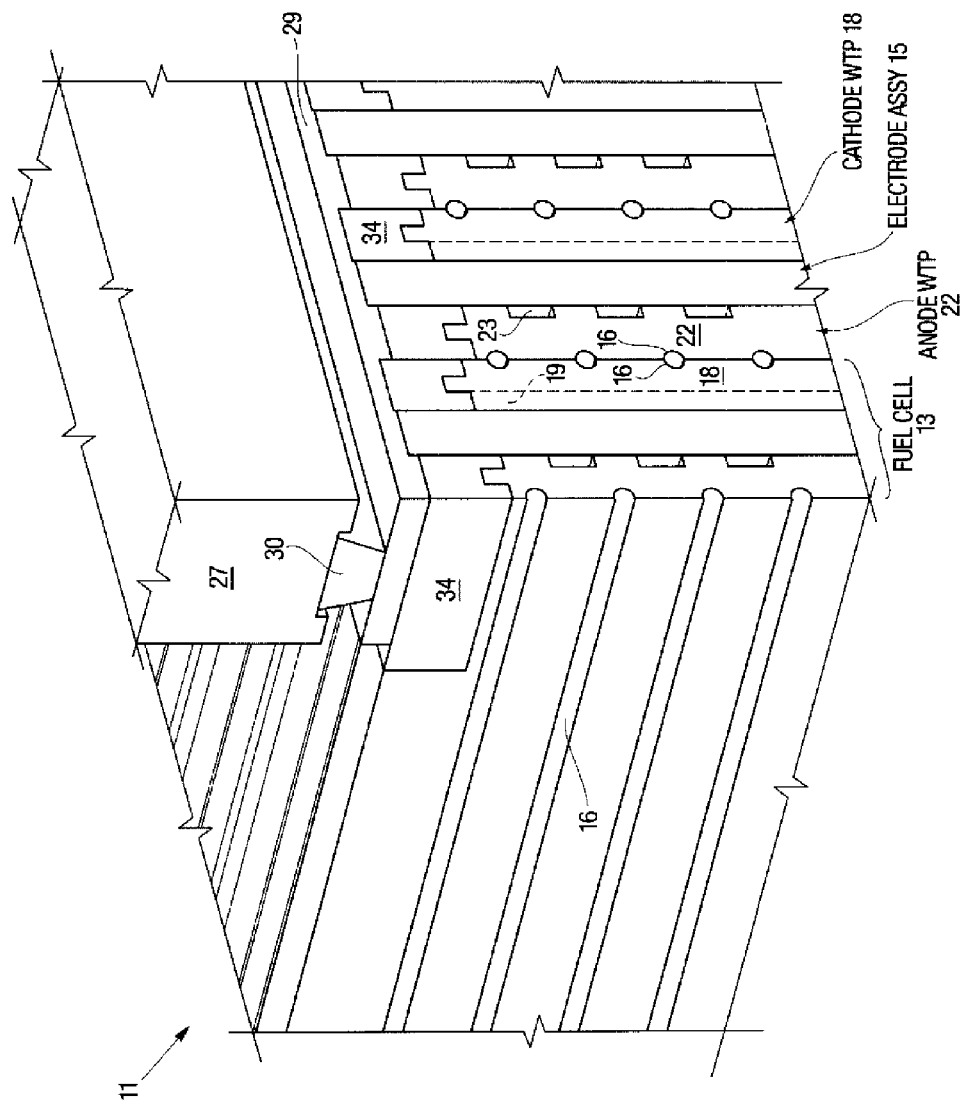
FIG. 3 is a fragmentary perspective view of FIG. 1 including silicone-impervious inserts according to this modality.

Referring to FIG. 3, a first general embodiment of the present modality prevents infusion of silicone or other elastomer into water transport plates (VVTPs) by means of a preformed elastomer-impervious insert 34 at the edge of each WTP in the region of the silicone 29. As used herein, the phrases "in the region" and "in the vicinity" include as planned for future use. The insert 34 prevents infusion of silicone into the water transport plates and avoids any breakdown in the bubble pressure of the water transport plates.

Figure 4:
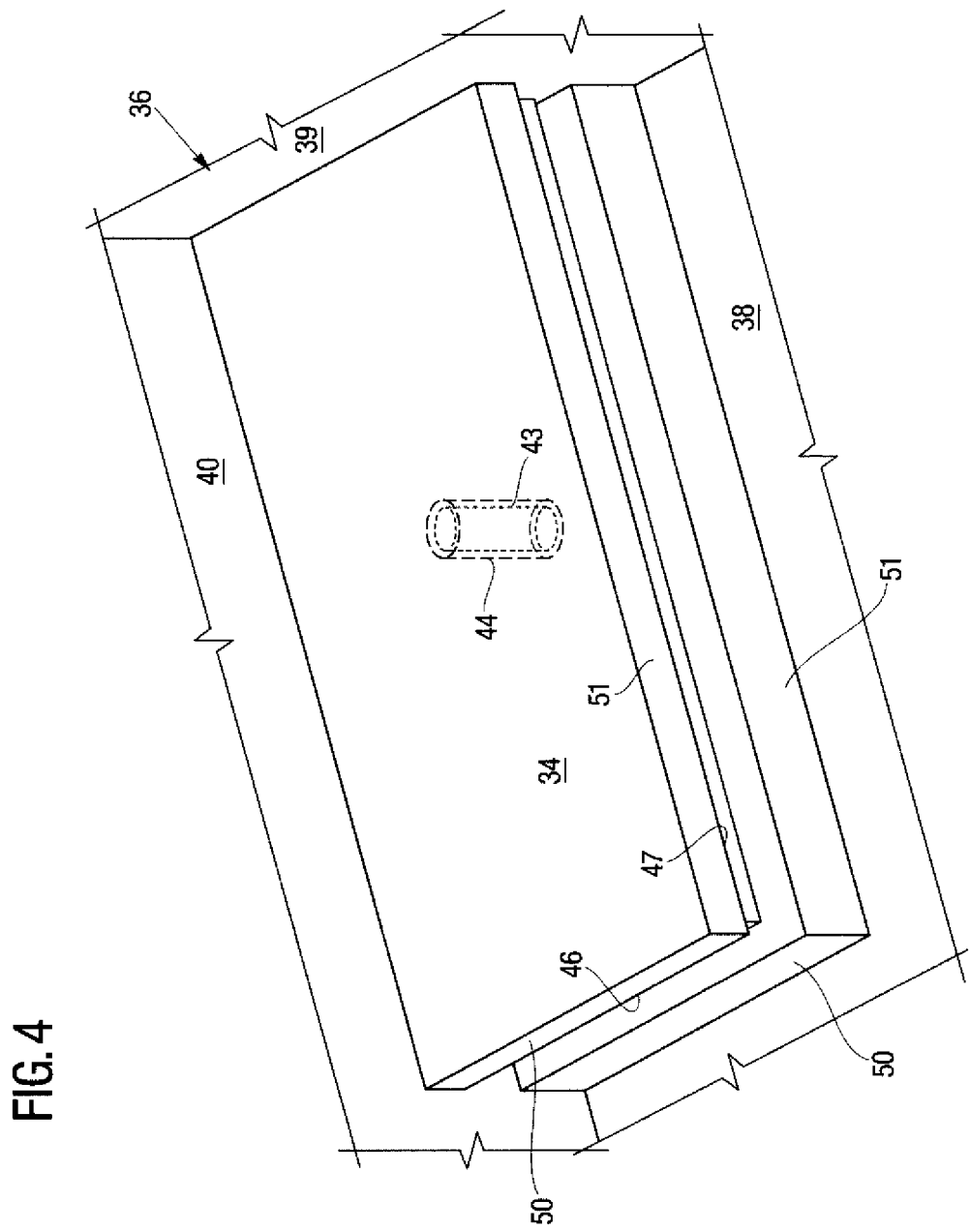
FIG. 4 is a fragmentary perspective view of a corner of a form having a silicone-impervious insert registered therein prior to molding of a WTP, drawn with exaggerated proportions.

The insert 34 may be provided (FIG. 4) by placing it into the corner of a mold 36 prior to filling the mold with a graphiteresin (or suitable other) mixture). In FIG. 4, only the adjacent faces 38-40 of mold sides and bottom are illustrated. To assist in assuring proper registration in the mold during the process of filling the mold with a conventional graphiteresin mixture, and molding the WTP, a pin 43 is attached to the bottom surface 38 of the mold to guide a hole 44 which is only part way through the insert 34.

To assist in joining the insert 34 to the WTP during the molding process, some surface enlargement for assisting the bonding of the insert 34 to the WTP is provided. In the embodiment of FIG. 4, there is a slot 46, 47 on each of the two respective edges 50, 51 of the insert 34 that will be contiguous with the WTP.

FIG. 5 illustrates that wavy surfaces 53 may be used in place of the slots 46, 47 to increase adhesion between the insert 34 and the WTP 18, 22. The wavy surface 53 may be mildly undulating, it may be abrupt, or it may be more like a saw tooth. However, it is beneficial to provide surfaces which are largely perpendicular to the edges of WTPs to which adhesion is desired.

FIG. 6 illustrates that holes 55 may be used to increase the surface area and improve adhesion between the insert 34 and the WTP 18, 22.

FIG. 7 illustrates that ribs 56 may be used to increase the surface area and improve adhesion between the insert 34 and the WTP 18, 22.

Other provisions for indexing the insert 34 to the mold 36 may be utilized, instead of the hole and pin 43, 44. However, it is necessary to not allow elastomersilicone to achieve a passageway through any indexing means which is selected.

In a second general embodiment of the invention, instead of casting pre-forms into molded WTPs, the WTPs may be completed in a conventional manner, then masked on one surface except where the elastomer-impervious material is required. Then a fusible or curable non-elastomer elastomer-impervious material in fluent form is deposited into the pores of the full thickness of the WTP in the vicinity of the elastomer seal and subsequently fused or cured.

The fluent material may be a suitably fine powder of non-elastomer, elastomer impervious, fusible plastic, or a eutectic mixture selected from bismuth, lead, tin and cadmium.

Since changes and variations of the disclosed embodiments may be made without departing from the concept's intent, it is not intended to limit the disclosure other than as required by the appended claims.

The invention claimed is:

1. A fuel cell stack comprising:
    a plurality of mutually contiguous fuel cells, each fuel cell including:
        an electrode assembly having a proton exchange membrane between a cathode catalyst support and an anode catalyst support;
        a porous, hydrophilic anode water transport plate disposed contiguously with the anode catalyst support; and
        a porous, hydrophilic cathode water transport plate disposed contiguously with the cathode catalyst support;
    an elastomer sealant covering edges of said fuel cells in areas where external manifolds are sealed to the fuel cells; and
    an elastomer-impervious material disposed across the full thickness of each water transport plate in the vicinity of the elastomer sealant.

2. The fuel cell stack of claim 1 wherein the elastomer-impervious material is an insert preformed and cast into the related water transport plate as said water transport plate is molded.

3. The fuel cell stack of claim 2 wherein edges of each insert in contact with a water transport plate include an adhesion-increasing surface enlargement.

4. The fuel cell stack of claim 3 wherein the adhesion-increasing surface enlargement includes a slot.

5. The fuel cell stack of claim 3 wherein the adhesion-increasing surface enlargement includes one or more holes.

6. The fuel cell stack of claim 3 wherein the adhesion-increasing surface enlargement includes a wavy surface.

7. The fuel cell stack of claim 3 wherein the adhesion-increasing surface enlargement includes ribs.

8. The fuel cell stack of claim 1 wherein the elastomer-impervious material is a non-elastomer plastic.

9. The fuel cell stack of claim 1 wherein the elastomer-impervious material is a metal.

10. The fuel cell stack of claim 1 wherein the elastomer-impervious material is a fusible or curable, non-porous, non-elastomer deposited in a fluent form within the pores of the full thickness of each water transport plate in the vicinity of the elastomer sealant and then fused or cured in situ.

11. The fuel cell stack of claim 10 wherein the elastomer-impervious material is a non-elastomer plastic.

12. The fuel cell stack of claim 10 wherein the elastomer-impervious material is a metal.

13. The fuel cell stack of claim 12 wherein the elastomer-impervious material is a eutectic mixture selected from bismuth, lead, tin and cadmium.

14. A method comprising preventing infusion of elastomer sealant into porous, hydrophilic water transport plates in a fuel cell stack by providing an elastomer-impervious material across the full thickness of each water transport plate in the vicinity of any elastomer sealant.

15. The method of claim 14 wherein providing the elastomer-impervious material includes casting into each water transport plate, as said water transport plate is molded, a preformed insert of said material.

16. The method of claim 14 wherein providing the elastomer-impervious material includes depositing a fusible or curable, non-porous, non-elastomer, elastomer-impervious material in fluent form within pores of the full thickness of each water transport plate in the vicinity of the elastomer sealant and fusing or curing the material.

17. The fuel cell stack of claim 1 wherein the elastomer-impervious material is not disposed across the thickness of the electrode assemblies.

* * * * *